US012342375B2

(12) United States Patent
Ikeda

(10) Patent No.: US 12,342,375 B2
(45) Date of Patent: Jun. 24, 2025

(54) COMMUNICATION APPARATUS, CONTROL METHOD OF COMMUNICATION APPARATUS, AND A NON-TRANSITORY COMPUTER-READABLE STORAGE MEDIUM

(71) Applicant: CANON KABUSHIKI KAISHA, Tokyo (JP)

(72) Inventor: Nobuhiro Ikeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 17/862,653

(22) Filed: Jul. 12, 2022

(65) Prior Publication Data
US 2022/0346149 A1 Oct. 27, 2022

Related U.S. Application Data

(63) Continuation of application No. PCT/JP2021/002215, filed on Jan. 22, 2021.

(30) Foreign Application Priority Data

Feb. 3, 2020 (JP) ................................. 2020-016492

(51) Int. Cl.
*H04W 74/0816* (2024.01)
*H04W 74/00* (2009.01)
(Continued)

(52) U.S. Cl.
CPC ..... *H04W 74/0816* (2013.01); *H04W 74/002* (2013.01); *H04W 74/0866* (2013.01); *H04W 84/12* (2013.01)

(58) Field of Classification Search
CPC ............. H04W 74/002; H04W 74/006; H04W 74/0816; H04W 74/0866; H04W 80/00; H04W 84/12
See application file for complete search history.

(56) References Cited

U.S. PATENT DOCUMENTS 8,811,312 B2 * 8/2014 Seok ..................... H04W 74/00
370/252
9,083,568 B2 * 7/2015 Ma .................... H04W 72/0453
(Continued)

FOREIGN PATENT DOCUMENTS

AU    2020315323 A1 * 2/2022 ............ H04W 48/12
CN    111345063 A  * 6/2020 ........... H04L 45/245
(Continued)

OTHER PUBLICATIONS

Jang et al., Discussion on Multi-link Setup, Sep. 16, 2019, IEEE, IEEE 802.11 Tbe Workgroup, IEEE802.11 Documents, https://mentor.ieee.org/802.11/documents (accessed on Aug. 8, 2024), doc. :IEEE 802.11-19/1509r1 (Year: 2019).*
(Continued)

*Primary Examiner* — Eric Nowlin
(74) *Attorney, Agent, or Firm* — Carter, DeLuca & Farrell LLP

(57) ABSTRACT

There is provided a communication apparatus comprising: one or more processors; and one or more memories storing instructions that, when executed by the one or more processors, cause the communication apparatus to: generate capability information about a method of a plurality of primary channels (M-PCH) compliant with the IEEE 802.11 series; and transmit a frame including the capability information to a communication partner apparatus, wherein the capability information includes at least one of information representing whether the plurality of communication apparatus supports the M-PCH method, and information representing availability of each of the primary channels.

5 Claims, 12 Drawing Sheets

(51) Int. Cl.
*H04W 74/08* (2024.01)
*H04W 84/12* (2009.01)

(56) References Cited

U.S. PATENT DOCUMENTS

| | | | | |
|---|---|---|---|---|
| 9,191,928 | B2* | 11/2015 | Seok | H04W 74/002 |
| 9,397,737 | B2* | 7/2016 | Seok | H04B 7/0452 |
| 9,445,345 | B2* | 9/2016 | Barriac | H04W 4/12 |
| 10,009,774 | B2* | 6/2018 | Trainin | H04W 16/14 |
| 10,021,646 | B2 | 7/2018 | Takahashi et al. | |
| 10,278,128 | B2 | 4/2019 | Takahashi et al. | |
| 10,321,365 | B2* | 6/2019 | Taneja | H04W 36/0061 |
| 10,327,246 | B2* | 6/2019 | Seok | H04L 1/0075 |
| 10,440,619 | B2* | 10/2019 | Taneja | H04W 36/0066 |
| 10,841,150 | B2* | 11/2020 | Sadeghi | H04L 27/2603 |
| 10,939,476 | B1* | 3/2021 | Chu | H04W 74/0816 |
| 11,032,207 | B2* | 6/2021 | Patil | H04W 74/006 |
| 11,051,307 | B2* | 6/2021 | Huang | H04W 72/0453 |
| 11,160,109 | B2* | 10/2021 | Yang | H04L 5/0098 |
| 11,304,127 | B2* | 4/2022 | Chu | H04W 24/10 |
| 11,357,025 | B2* | 6/2022 | Naribole | H04W 72/535 |
| 11,381,999 | B2* | 7/2022 | Patil | H04W 76/15 |
| 11,558,777 | B2* | 1/2023 | Huang | H04W 28/06 |
| 11,627,610 | B1* | 4/2023 | Chu | H04W 74/085 370/329 |
| 11,672,038 | B2* | 6/2023 | Kwon | H04W 76/15 370/338 |
| 11,804,923 | B2* | 10/2023 | Ryu | H04W 72/04 |
| 11,832,315 | B1* | 11/2023 | Chu | H04W 76/15 |
| 11,838,951 | B2* | 12/2023 | Jang | H04W 74/0816 |
| 11,877,321 | B2* | 1/2024 | Lu | H04W 74/0816 |
| 12,048,007 | B2* | 7/2024 | Aio | H04B 7/0413 |
| 12,144,063 | B2* | 11/2024 | Chu | H04L 5/0044 |
| 2007/0291716 | A1* | 12/2007 | Morales Barroso | H04L 12/46 370/338 |
| 2012/0163309 | A1* | 6/2012 | Ma | H04B 7/2606 370/329 |
| 2014/0355537 | A1* | 12/2014 | Seok | H04W 74/00 370/329 |
| 2015/0078298 | A1* | 3/2015 | Barriac | H04W 84/12 370/329 |
| 2017/0034838 | A1* | 2/2017 | Trainin | H04W 74/0808 |
| 2017/0367016 | A1* | 12/2017 | Taneja | H04L 63/029 |
| 2018/0160429 | A1* | 6/2018 | Seok | H04L 1/0075 |
| 2018/0199342 | A1* | 7/2018 | Rai | H04K 3/226 |
| 2019/0110285 | A1* | 4/2019 | Huang | H04W 72/0446 |
| 2019/0158413 | A1* | 5/2019 | Patil | H04W 28/0838 |
| 2019/0280919 | A1* | 9/2019 | Sadeghi | H04W 72/04 |
| 2020/0107393 | A1* | 4/2020 | Chu | H04L 1/1621 |
| 2020/0137626 | A1* | 4/2020 | Huang | H04L 1/1819 |
| 2020/0178299 | A1* | 6/2020 | Yang | H04W 74/0808 |
| 2020/0359259 | A1* | 11/2020 | Patil | H04W 88/08 |
| 2021/0051574 | A1* | 2/2021 | Chu | H04W 84/18 |
| 2021/0076398 | A1* | 3/2021 | Naribole | H04W 74/0816 |
| 2021/0076412 | A1* | 3/2021 | Naribole | H04W 76/15 |
| 2021/0144787 | A1* | 5/2021 | Kwon | H04W 76/15 |
| 2021/0212118 | A1* | 7/2021 | Lu | H04W 74/0816 |
| 2021/0385006 | A1* | 12/2021 | Ryu | H04L 5/0098 |
| 2022/0053559 | A1* | 2/2022 | Jang | H04W 74/0816 |
| 2022/0167444 | A1* | 5/2022 | Jang | H04W 76/15 |
| 2022/0191930 | A1* | 6/2022 | Aio | H04B 7/0413 |
| 2022/0240333 | A1* | 7/2022 | Jang | H04L 69/24 |
| 2022/0272689 | A1* | 8/2022 | Inohiza | H04W 8/24 |
| 2022/0287122 | A1* | 9/2022 | Wang | H04W 8/22 |
| 2022/0346149 | A1* | 10/2022 | Ikeda | H04W 74/0816 |
| 2022/0346176 | A1* | 10/2022 | Jang | H04W 84/12 |
| 2022/0418027 | A1* | 12/2022 | Takada | H04W 76/15 |
| 2023/0040910 | A1* | 2/2023 | Hwang | H04W 74/0808 |
| 2023/0180290 | A1* | 6/2023 | Garcia Rodriguez | H04W 74/0816 370/329 |
| 2024/0334488 | A1* | 10/2024 | Aio | H04W 76/15 |

FOREIGN PATENT DOCUMENTS

| | | | | |
|---|---|---|---|---|
| CN | 112566272 | A * | 3/2021 | H04L 69/14 |
| CN | 112566274 | A * | 3/2021 | H04W 24/08 |
| CN | 113068214 | A * | 7/2021 | H04W 24/08 |
| CN | 114208295 | A * | 3/2022 | H04W 48/12 |
| CN | 114223310 | A * | 3/2022 | H04L 69/14 |
| CN | 114982367 | A * | 8/2022 | H04L 69/14 |
| CN | 114223310 | B * | 1/2024 | H04L 69/14 |
| CN | 113068214 | B * | 3/2024 | H04W 24/08 |
| CN | 111345063 | B * | 5/2024 | H04L 45/245 |
| EP | 3780739 | A1 * | 2/2021 | H04B 17/318 |
| EP | 3793313 | A1 * | 3/2021 | H04L 69/14 |
| EP | 3793314 | A1 * | 3/2021 | H04W 24/08 |
| EP | 3846574 | A1 * | 7/2021 | H04W 24/08 |
| EP | 3780739 | B1 * | 4/2022 | H04B 17/318 |
| EP | 3986023 | A1 * | 4/2022 | H04L 69/14 |
| EP | 4093141 | A1 * | 11/2022 | H04L 69/14 |
| EP | 4117382 | A1 * | 1/2023 | H04L 5/0048 |
| EP | 4231745 | A1 * | 8/2023 | H04W 24/10 |
| EP | 3711349 | B1 * | 10/2023 | H04L 45/245 |
| JP | 2018-050133 | A | 3/2018 | |
| JP | 2018-133657 | A | 8/2018 | |
| JP | 2021125749 | A * | 8/2021 | H04W 74/008 |
| JP | 2022540876 | A * | 9/2022 | |
| JP | 7368587 | B2 * | 10/2023 | H04L 69/14 |
| JP | 7505479 | B2 * | 6/2024 | H04B 7/0413 |
| JP | 2024107276 | A * | 8/2024 | H04B 7/0413 |
| KR | 20200086679 | A * | 7/2020 | |
| KR | 20210031386 | A * | 3/2021 | |
| KR | 20210091661 | A * | 7/2021 | |
| KR | 102295532 | B1 * | 8/2021 | |
| KR | 20210127926 | A * | 10/2021 | |
| KR | 20220024498 | A * | 3/2022 | |
| SG | 11202003243X | A * | 5/2020 | |
| TW | 202112095 | A * | 3/2021 | H04W 24/08 |
| TW | 202112164 | A * | 3/2021 | H04L 69/14 |
| TW | 202130219 | A * | 8/2021 | H04W 24/08 |
| TW | I761626 | B * | 4/2022 | |
| TW | I789667 | B * | 1/2023 | |
| WO | WO-2015042018 | A1 * | 3/2015 | H04W 4/12 |
| WO | WO-2019040345 | A1 * | 2/2019 | |
| WO | WO-2019099268 | A1 * | 5/2019 | H04L 45/245 |
| WO | WO-2020060145 | A1 * | 3/2020 | H04W 74/0808 |
| WO | WO-2020085824 | A1 * | 4/2020 | H04L 1/0025 |
| WO | WO-2020174823 | A1 * | 9/2020 | H04B 7/0413 |
| WO | WO-2021010606 | A1 * | 1/2021 | H04L 69/14 |
| WO | WO-2021011476 | A1 * | 1/2021 | H04W 48/12 |
| WO | WO-2021049817 | A1 * | 3/2021 | H04W 76/11 |
| WO | WO-2021100695 | A1 * | 5/2021 | H04W 72/0453 |
| WO | WO-2021145601 | A1 * | 7/2021 | H04L 69/14 |
| WO | WO-2021157385 | A1 * | 8/2021 | H04W 74/008 |
| WO | WO-2021176957 | A1 * | 9/2021 | H04L 5/0048 |
| WO | WO-2022079801 | A1 * | 4/2022 | H04W 24/10 |

OTHER PUBLICATIONS

Jang et al., Discussion on Multi-link Setup, Sep. 16, 2019, IEEE, IEEE 802.11 Tbe Workgroup, IEEE802.11 Documents, https://mentor.ieee.org/802.11/documents (accessed on Aug. 8, 2024), doc. :IEEE 802.11-19/1509r5 (Year: 2019).*

Patil et al., Multi-link: Link Management, Sep. 4, 2019, IEEE, IEEE 802.11 Tbe Workgroup, IEEE802.11 Documents, https://mentor.ieee.org/802.11/documents (accessed on Aug. 8, 2024), doc.:IEEE 802.11-19/1528r0 (Year: 2019).*

Zhou et al., Simultaneous Tx/Rx Capability Indication for Multi-link Operation, Sep. 2019, IEEE, IEEE 802.11 Tbe Workgroup, IEEE802.11 Documents, https://mentor.ieee.org/802.11/documents (accessed on Aug. 8, 2024), doc.:IEEE 802.11-19/1550r1 (Year: 2019).*

Hwang et al., Multi-link Setup Procedure, Sep. 2019, IEEE, IEEE 802.11 Tbe Workgroup, IEEE802.11 Documents, https://mentor.ieee.org/802.11/documents (accessed on Aug. 8, 2024), doc.:IEEE 802.11-19/1614r1 (Year: 2019).*

Jang et al., Indication of Multi-link Information, Jan. 13, 2020, IEEE, IEEE 802.11 Tbe Workgroup, IEEE802.11 Documents, https://

(56) References Cited

OTHER PUBLICATIONS mentor.ieee.org/802.11/documents (accessed on Aug. 8, 2024), doc. :IEEE 802.11-20/0028r0 (Year: 2020).*

Chitrakar et al., Multi-link Element Format, May 11, 2020, IEEE, IEEE 802.11 Tbe Workgroup, IEEE802.11 Documents, https://mentor.ieee.org/802.11/documents (accessed on Aug. 8, 2024), doc. :IEEE 802.11-20/0772r3 (Year: 2020).*

Chitrakar et al., Multi-link Element Format, May 11, 2020, IEEE, IEEE 802.11 Tbe Workgroup, IEEE802.11 Documents, https://mentor.ieee.org/802.11/documents (accessed on Aug. 8, 2024), doc. :IEEE 802.11-20/0772r4 (Year: 2020).*

Huang et al., Discussion on Multi-link Setup, Sep. 2, 2020, IEEE, IEEE 802.11 Tbe Workgroup, IEEE802.11 Documents, https://mentor.ieee.org/802.11/documents (accessed on Aug. 8, 2024), doc. :IEEE 802.11-20/1534r1 (Year: 2020).*

Huang et al., Discussion on Multi-link Setup, Sep. 2, 2020, IEEE, IEEE 802.11 Tbe Workgroup, IEEE802.11 Documents, https://mentor.ieee.org/802.11/documents (accessed on Aug. 8, 2024), doc. :IEEE 802.11-20/1534r2 (Year: 2020).*

Huang et al., Discussion on Multi-link Setup, Sep. 2, 2020, IEEE, IEEE 802.11 Tbe Workgroup, IEEE802.11 Documents, https://mentor.ieee.org/802.11/documents (accessed on Aug. 8, 2024), doc. :IEEE 802.11-20/1534r4 (Year: 2020).*

Notice of Reasons for Refusal issued by the Japanese Patent Office on Mar. 1, 2024 in corresponding JP Patent Application No. 2020-016492, with English translation.

International Search Report issued by the Japan Patent Office on Apr. 27, 2021 in corresponding International Application No. PCT/JP2021/002215, with English translation.

Li, Yunbo et al., "Channel Access Design for Synchronized Multi-Links", IEEE 802.11-19/1548r4, IEEE, Internet<URL:https://mentor.ieee.org/802.11/dcn/19/11-19-1548-04-00be-channel-access-design-for-synchronized-multi-links.pptx>, (Jan. 16, 2020) pp. 1-13.

Akhmetov, Dmitry et al., "Performance aspects of Multi-link operations with constraints", IEEE 802.11-19/1541r1, IEEE, Internet<URL:https://mentor.ieee.org/802.11/dcn/19/11-19-1541-01-00be-performance-aspects-of-multi-link-operations-with-constraints.pptx>, (Nov. 10, 2019) pp. 1-22.

Jang, In-Sun et al., "Indication of Multi-link Information", IEEE 802.11-19/0028r0, IEEE, Internet<https://mentor.ieee.org/802.11/dcn/19/11-19-1548-04-00be-channel-access-design-for-synchronized-multi-links.pptx>, (Jan. 12, 2020) pp. 1-14.

Jang, In-Sun et al., "Discussion on Multi-link Setup", IEEE 802.11-19/1509r5, IEEE, Internet<URL:https://mentor.ieee.org/802.11/dcn/19/11-19-1509-05-00be-discussion-on-multi-link-setup.pptx>, (Nov. 13, 2019) pp. 1-14.

Patil, Abhishek et al., "Multi-Link Association", IEEE 802.11-19/1525r2, IEEE, Internet<URL:https://mentor.ieee.org/802.11/dcn/19/11-19-1525-02-00be-multi-link-association.pptx>, (Nov. 14, 2019) pp. 1-12.

Notice of Reasons for Refusal issued by the Japanese Patent Office on Jul. 1, 2024 in corresponding JP Patent Application No. 2020-016492, with English translation.

* cited by examiner

FIG. 10

PCH SUPPORT FIELD  1001

| BIT VALUES | |
|---|---|
| 00 | NOT SUPPORTED |
| 01 | ONLY S-PCH METHOD IS SUPPORTED |
| 10 | ONLY M-PCH METHOD IS SUPPORTED |
| 11 | BOTH METHODS (M-PCH, S-PCH) ARE SUPPORTED |

M-PCH AVAILABILITY FIELD  1002

| BIT VALUES | |
|---|---|
| 1 | AVAILABLE |
| 0 | UNAVAILABLE |

COMMUNICATION APPARATUS, CONTROL METHOD OF COMMUNICATION APPARATUS, AND A NON-TRANSITORY COMPUTER-READABLE STORAGE MEDIUM

CROSS-REFERENCE TO RELATED APPLICATIONS

This application is a Continuation of International Patent Application No. PCT/JP2021/002215, filed Jan. 22, 2021, which claims the benefit of Japanese Patent Application No. 2020-016492, filed Feb. 3, 2020, both of which are hereby incorporated by reference herein in their entirety.

BACKGROUND OF THE INVENTION

Field of the Invention

The present invention relates to communication control of a wireless LAN.

Background Art

Recently, the Internet usage is increasing year by year along with the progress of information communication technologies. To meet increasing demands, various communication technologies are being developed. Among these technologies, a wireless LAN (Local Area Network (to be referred to as WLAN hereinafter)) technology has implemented high throughput in the Internet communication of packet data, audio, video, and the like by portable terminals in a public space and a private space such as a home or a factory.

Many standardization operations by the IEEE (Institute of Electrical and Electronics Engineers) 802 standards committee have played an important role in the progress of the WLAN technology. IEEE 802.11 is known as one of WLAN communication standards, IEEE 802.11a/b/g/n/ac and a draft standard for the latest IEEE 802.11ax standard have been released, and various technologies are being developed actively even now (PTL 1).

For higher throughput, higher reliability, and lower latency, IEEE 802.11be Task Group (TG) has been established in 2018 as a successor standard of IEEE 802.11ax. One goal for the IEEE 802.11be TG is reliable low-latency (RLL) communication (RLL communication), and application particularly to remote control of an industrial robot and real-time applications such as augmented reality/virtual reality, games, and drones are expected. In such a use case, the conditions of reliability and latency change depending on the environment. The order for latency is to satisfy 1 to 10 ms, and that for reliability (transmission success rate) is to satisfy 99.9999%.

CITATION LIST

Patent Literature

PTL 1: Japanese Patent Laid-Open No. 2018-50133

To implement RLL communication, the latency of channel access of the wireless LAN needs to be reduced by effectively using communication resources. However, in an OBSS (Overlapping BSS) environment where a plurality of BSSs (Basic Service Set) overlap, it is difficult to occupy a channel, ensure a free channel, and thus implement RLL communication. To utilize unused resources scattered in a plurality of channels/bands, a channel access technology using a plurality of primary channels (multi-primary channels (M-PCH)) is examined in IEEE 802.11be.

However, a mechanism for announcing capability information that designates multi-primary channels (M-PCH) has not been proposed so far.

SUMMARY OF THE INVENTION

The present disclosure has been made to solve the above-described drawbacks, and provides a mechanism capable of announcing capability information that designates multi-primary channels (M-PCH).

One aspect of the present invention provides a communication apparatus comprising: one or more processors; and one or more memories storing instructions that, when executed by the one or more processors, cause the communication apparatus to: generate capability information about a method of a plurality of primary channels (M-PCH) compliant with the IEEE 802.11 series; and transmit a frame including the capability information to a communication partner apparatus, wherein the capability information includes at least one of information representing whether the plurality of communication apparatus supports the M-PCH method, and information representing availability of each of the primary channels.

Further features of the present invention will become apparent from the following description of exemplary embodiments with reference to the attached drawings.

BRIEF DESCRIPTION OF THE DRAWINGS

FIG. 10 is a view showing an example of set values in the M-PCH method capability information.

DESCRIPTION OF THE EMBODIMENTS

Figure 1:
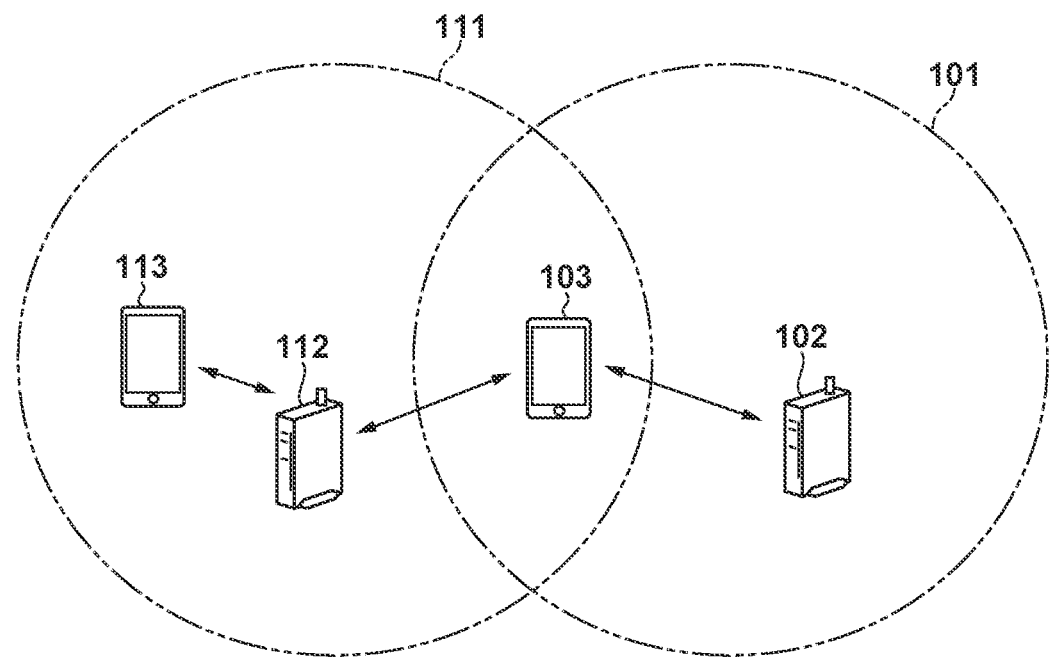
FIG. 1 is a view showing an example of a network configuration in an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

[Example of Network Configuration]

FIG. 1 shows an example of a network configuration in an embodiment. FIG. 1 shows, as communication apparatuses, a network BSS (Basic Service Set) 101 and a BSS 111 that are constituted by two access points (APs) 102 and 112, and two stations (STAs) 103 and 113, respectively. As shown in FIG. 1, a network formed by the AP 102 is represented by the BSS 101, and a network formed by the AP 112 is represented by the BSS 111. In the embodiment, the STA 113 constituting the BSS 111 can transmit/receive frames to/from the AP 112, and the STA 103 constituting the BSS 101 can transmit/receive frames to/from the AP 102. The STA 103 is in an OBSS (Overlapping BSS) environment where the STA 103 is interfered with a radio channel used by the AP 112 of the adjacent BSS 111. The STA 103 allows the BSS 111 to simultaneously use a primary channel available in the BSS 101.

Note that the network configuration shown in FIG. 1 is merely an example. The following discussion is applicable to, for example, a network (BSS) including many communication apparatuses in a wider range, or the positional relationship between various wireless communication apparatuses.

[Arrangement of Communication Apparatus]

(Example of Hardware Arrangement)

Figure 2:
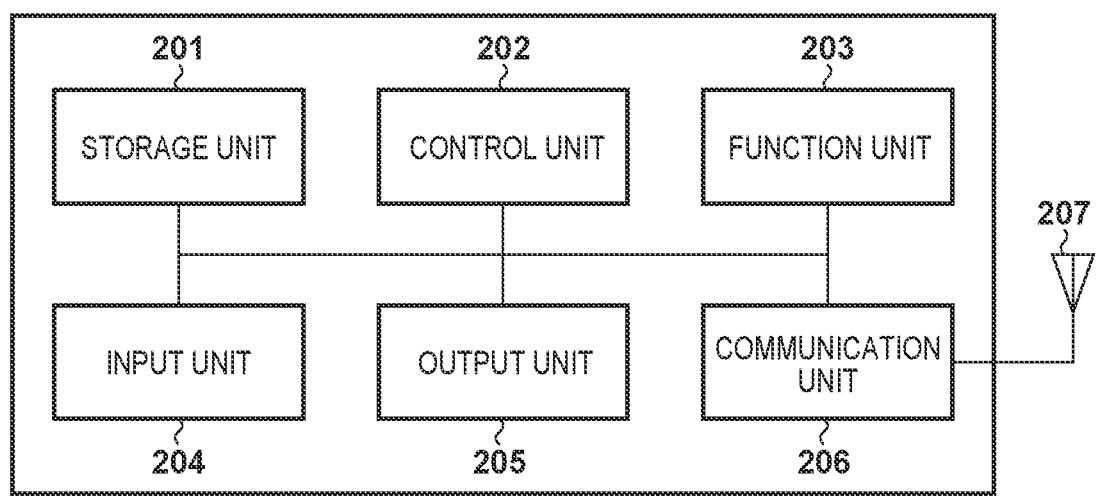
FIG. 2 is a block diagram showing an example of the hardware arrangement of a communication apparatus.

FIG. 2 shows an example of the hardware arrangement of the communication apparatus (APs 102 and 112 and STAs 103 and 113 in the example of the network configuration in FIG. 1) in the embodiment. The communication apparatus includes, as an example of its hardware arrangement, a storage unit 201, a control unit 202, a function unit 203, an input unit 204, an output unit 205, a communication unit 206, and an antenna 207.

The storage unit 201 is formed by both or either of a ROM and a RAM, and stores programs for performing various operations (to be described later) and various kinds of information such as communication parameters for wireless communication. The ROM stands for Read Only Memory, and the RAM stands for Random Access Memory. Note that a storage medium such as a flexible disk, a hard disk, an optical disk, a magnetooptical disk, a CD-ROM, a CD-R, a magnetic tape, a non-volatile memory card, or a DVD may be used as the storage unit 201, other than memories such as a ROM and a RAM.

The control unit 202 is formed by, for example, a processor such as a CPU or an MPU, an ASIC (Application Specific Integrated Circuit), a DSP (Digital Signal Processor), an FPGA (Field Programmable Gate Array), or the like. The CPU stands for Central Processing Unit, and the MPU stands for Micro Processing Unit. The control unit 202 controls the entire communication apparatus by executing the programs stored in the storage unit 201. Note that the control unit 202 may control the entire communication apparatus in cooperation with the programs stored in the storage unit 201 and an OS (Operation System). The control unit 202 controls the function unit 203 to execute predetermined processing such as image capturing, printing, or projection. The function unit 203 is hardware used by the communication apparatus to execute predetermined processing. For example, in a case where the communication apparatus is a camera, the function unit 203 is an image capturing unit and performs image capturing processing. For example, in a case where the communication apparatus is a printer, the function unit 203 is a printing unit and performs printing processing. For example, in a case where the communication apparatus is a projector, the function unit 203 is a projection unit and performs projection processing. Data to be processed by the function unit 203 may be data stored in the storage unit 201, or may be data communicated with another communication apparatus via the communication unit 206 (to be described later).

The input unit 204 accepts various operations from a user. The output unit 205 performs various outputs to the user. Here, the output by the output unit 205 includes at least one of a display on a screen, an audio output by a loudspeaker, a vibration output, and the like. Note that both the input unit 204 and the output unit 205 may be implemented by one module, like a touch panel.

The communication unit 206 controls wireless communication complying with the IEEE 802.11 standard series, or controls IP communication. In the embodiment, the communication unit 206 can perform processing complying with at least the IEEE 802.11be standard. In addition, the communication unit 206 controls the antenna 207 to transmit and receive radio signals for wireless communication. The communication apparatus communicates a content such as image data, document data, or video data with another communication apparatus via the communication unit 206.

The antenna 207 is an antenna capable of receiving signals in one of the sub-GHz band, 2.4 GHz band, 5 GHz band, and 6 GHz band. The antenna 207 may be constituted physically by one or more antennas in order to implement MIMO (Multi-Input and Multi-Output) transmission/reception.

(Example of Functional Arrangement)

Figure 3:
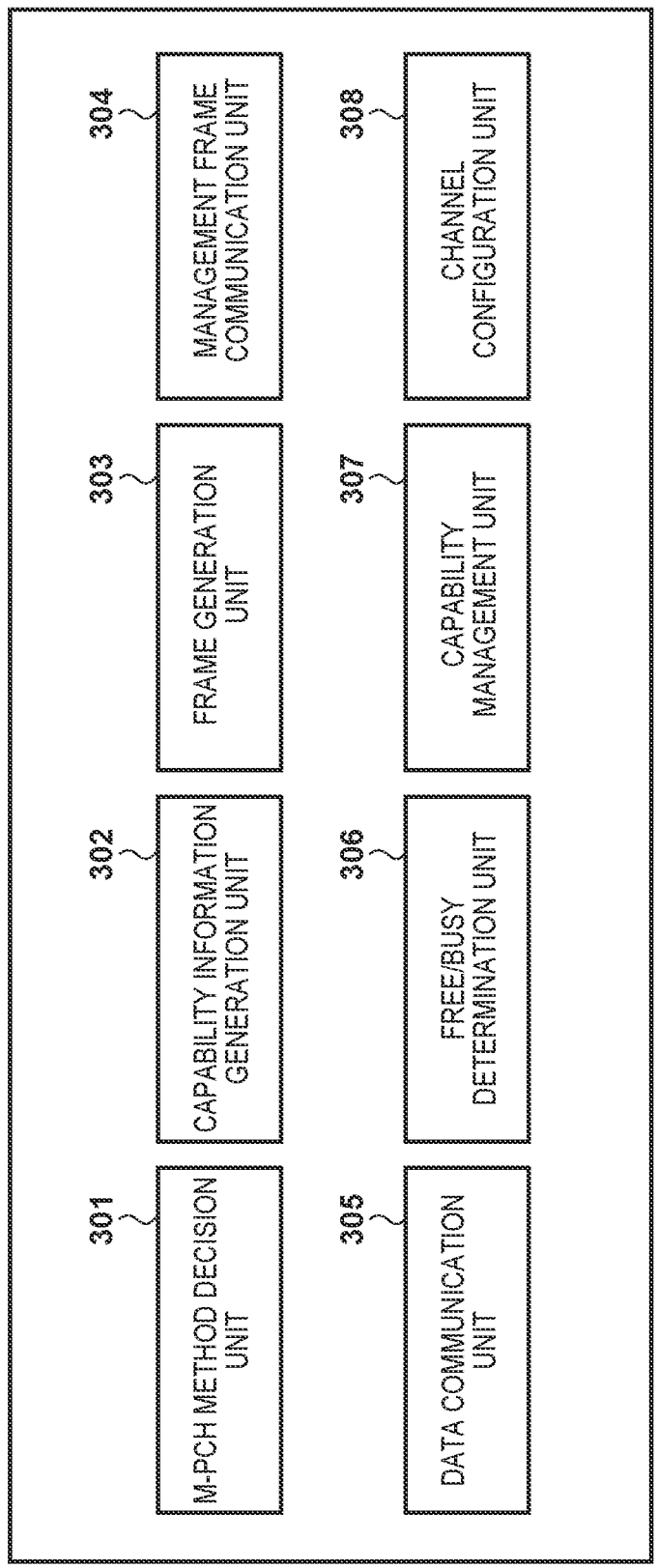
FIG. 3 is a block diagram showing an example of the functional arrangement of the communication apparatus.

FIG. 3 shows an example of the functional arrangement of the communication apparatus (APs 102 and 112 and STAs 103 and 113 in the example of the network configuration in FIG. 1) in the embodiment. The communication apparatus includes, as an example of its functional arrangement, a M-PCH method decision unit 301, a capability information generation unit 302, a frame generation unit 303, a management frame communication unit 304, a data communication unit 305, a free/busy determination unit 306, a capability management unit 307, and a channel configuration unit 308.

The M-PCH method decision unit 301 decides a PCH method to be used for communication with a partner communication apparatus. The capability information generation unit 302 generates capability information to be included in a management frame to be transmitted. The management frame is a management frame defined by the standards of the IEEE 802.11 series, and is a MAC frame such as a Beacon frame, a Probe Request frame, a Probe Response frame, an Association Request frame, an Association Response frame, a Reassociation Request frame, or a Reassociation Response frame. In the embodiment, the capability information generation unit 302 generates/updates capability information (to be referred to as M-PCH method capability information) that designates a M-PCH method, which will be described later with reference to FIG. 9. The M-PCH method capability information can include information (PCH support field 904 in FIG. 9 to be described later) representing the support status of a PCH method, and pieces of information (M-PCH availability fields 905 to 913 in FIG. 9) each representing whether each PCH is available. The frame generation unit 303 performs control regarding frame generation.

The management frame communication unit 304 performs control for transmitting/receiving the above-described management frame. For example, in a case where a STA connects to a network (BSS) managed by an AP, the STA transmits an Association Request frame, and the AP transmits an Association Response frame as the response. The data communication unit 305 performs control for transmitting/receiving a data frame using a channel (communication band) configured by the channel configuration unit 308. The free/busy determination unit 306 performs free/busy determination with respect to a plurality of primary channels. This determination is made by transmitting/receiving, by the free/busy determination unit 306, a RTS (Request To Send) message and a CTS (Clear To Send) message that are control frames in the standards of the IEEE 802.11 series. The capability management unit 307 performs such management as to store capability information in the storage unit 201. The capability management unit 307 checks a PCH method supported by the communication apparatus at an arbitrary timing. The channel configuration unit 308 configures a channel (communication band) used to communicate a data frame by the data communication unit 305. For example, the channel configuration unit 308 selects (decides) a primary channel, and configures a communication band by bonding the primary channel and a secondary channel serving as a channel adjacent to the primary channel (channel bonding). At this time, as a condition for selecting (deciding) a primary channel, the channel configuration unit 308 may select, for example, a primary channel capable of configuring a wider communication channel for high-speed data transmission. Alternatively, the channel configuration unit 308 may select a primary channel that satisfies conditions such as quick response, and low latency and high reliability essential for a temporally restricted network. The channel configuration unit 308 may select a primary channel from a plurality of channels available in each frequency band (for example, 2.4 GHz/5 GHz/6 GHz) in accordance with the predetermined condition.

Figure 9:
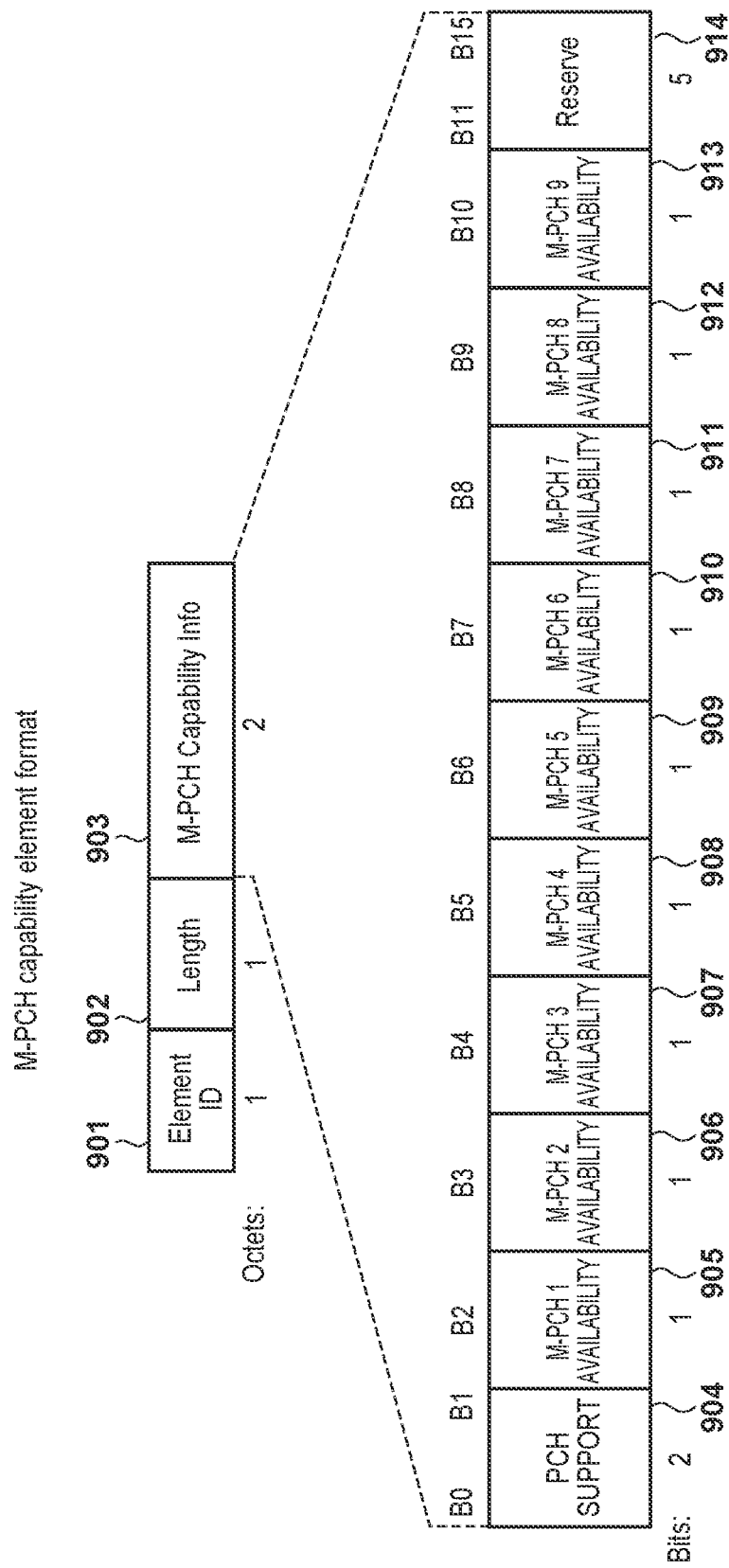
FIG. 9 is a view showing an example of M-PCH method capability information.

An example of the M-PCH method capability information will be explained with reference to FIG. 9. FIG. 9 is a view showing an example of the M-PCH method capability information (M-PCH capability element). The M-PCH capability element is formed from an Element ID field, a Length field, and Element-specific information, similar to another Information Element defined by the standards of the IEEE 802.11 series. In an Element ID field 901, information for identifying an Element is stored. In a Length field 902, information representing the data length of the Element is stored. In a M-PCH capability Info field 903, Element-specific information is stored, including information (field 904) representing the support status of a PCH method, and pieces of information (fields 905 to 913) representing whether each M-PCH channel is available. The PCH support field 904 includes 2-bit information representing the support status of a PCH method, and the M-PCH availability fields 905 to 913 each include 1-bit information representing whether corresponding M-PCH 1 to M-PCH 9 are available (to be described later with reference to FIG. 10). M-PCH 1 to M-PCH 9 are available in the 5 GHz band, are exemplary primary channels that can be designated in the embodiment, and will be described with reference to FIG. 11. A Reserve field 914 is a 5-bit free (reserved) part to cope with a future expansion.

Note that the M-PCH capability Info field 903 is 2 octets (16 bits) in size in the description of FIG. 9, but the names of the fields and the positions and sizes of bits are not limited to this example. For example, pieces of similar information may be stored with different field names in a different order and different sizes.

Examples of different forms of the M-PCH method capability information will be described with reference to FIGS. 12 and 13. First, in FIG. 12, the Element ID field 901 and the Length field 902 are similar to those in FIG. 9, but the length of data coded in the Length field 902 for information setting is 3 octets. A M-PCH capability Info field 1201 is Element-specific information, and includes the support statuses (fields 1202 to 1210) of PCH methods corresponding to M-PCH 1 to M-PCH 9. Each of the PCH support fields 1202 to 1210 is 2-bit information representing the support status of a PCH method, similar to the information (field 904) representing the support status of a PCH method in FIG. 9 (to be described later with reference to FIG. 10). M-PCH 1 to M-PCH 9 are similar to those in FIG. 9, and a description thereof will not be repeated. A Reserve field 1211 is a 6-bit free (reserved) part to cope with a future expansion.

Figure 12:
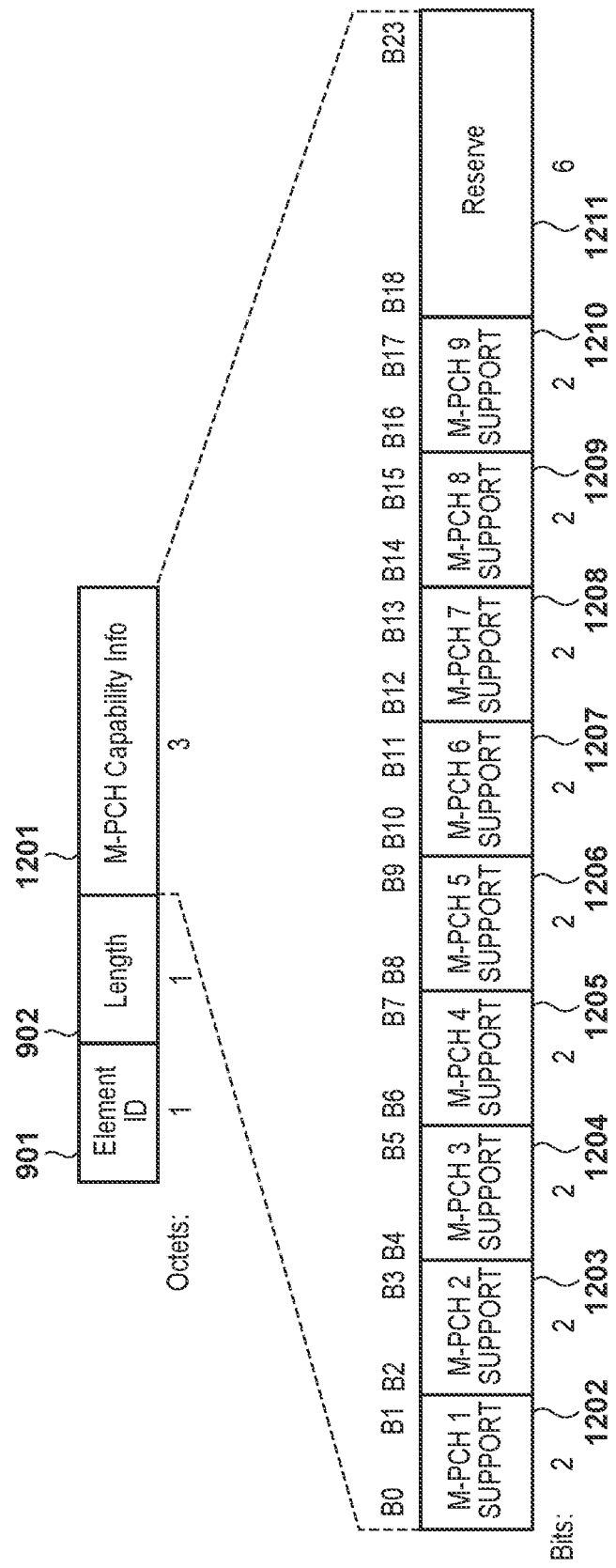
FIG. 12 is a view showing another example of the M-PCH method capability information.
Figure 13:
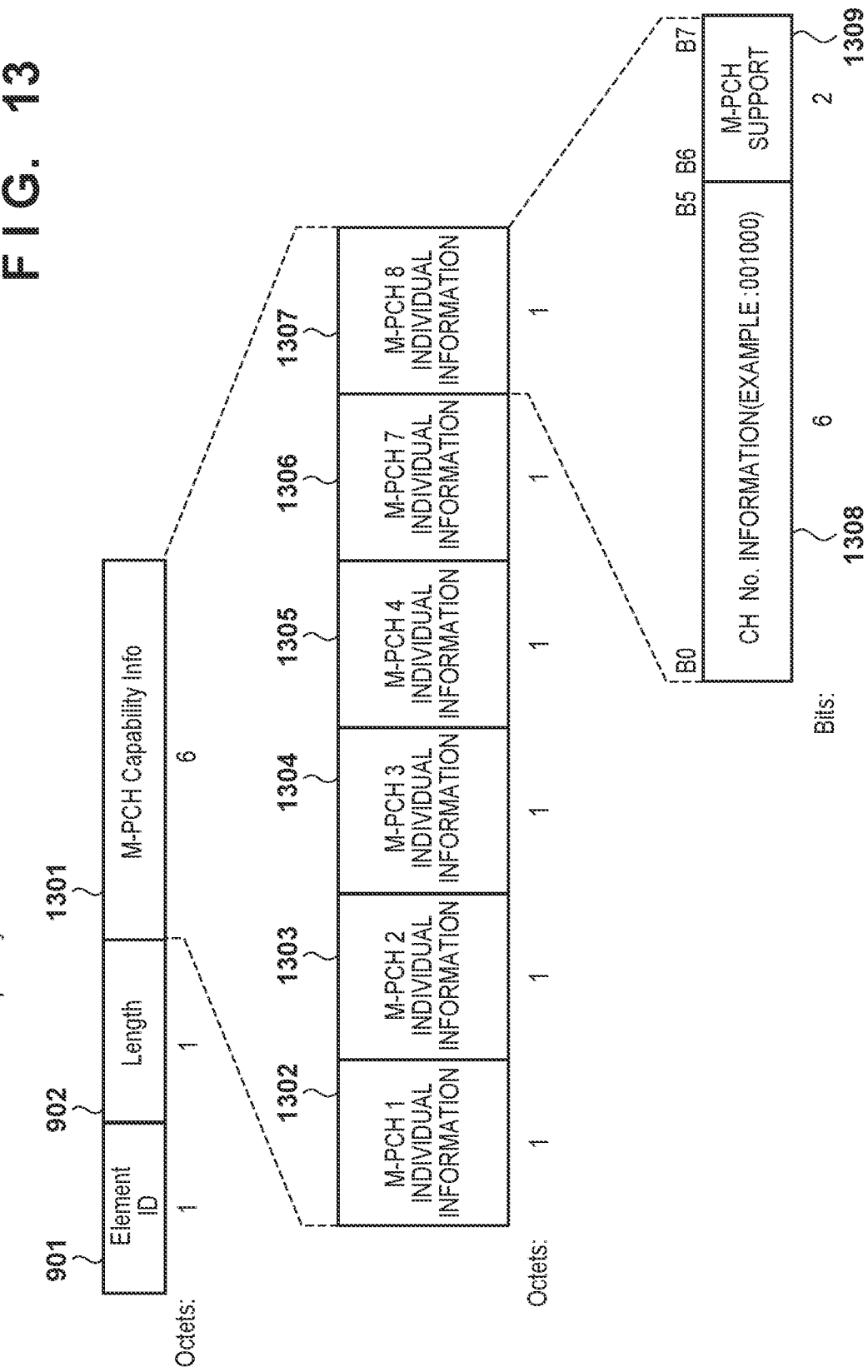
FIG. 13 is a view showing still another example of the M-PCH method capability information.

FIG. 13 shows another example of a different form of the M-PCH method capability information, similar to FIGS. 9 and 12. In FIG. 13, the Element ID field 901 and the Length field 902 are similar to those in FIGS. 9 and 12, but the length of data coded in the Length field 902 for information setting is 6 octets. A M-PCH capability Info field 1301 is Element-specific information, and includes pieces of individual information (fields 1302 to 1307) of available primary channels M-PCH 1 to 4, 7, and 8. At this time, as for the available primary channels M-PCH 1 to 4, 7, and 8, results of free/busy determination processing by the free/busy determination unit 306 are reflected. Details of this processing will be described later with reference to FIG. 8. Each of the M-PCH individual information fields 1302 to 1307 is 1-octet information representing the support status of a PCH method, and is formed from a 6-bit channel number field 1308 and 2-bit information representing the support status of a PCH method. A 2-bit information field 1309 representing the support status of a PCH method, mentioned above, is similar to the information (fields 904 and 1202 to 1210) representing the support status of a PCH method in FIGS. 9 and 12 (to be described with reference to FIG. 10).

FIG. 10 shows an example of bit values set in the PCH support fields 904 and 1202 to 1210 and the M-PCH availability fields 905 to 913 in FIGS. 9, 12, and 13. In FIG. 10, a table 1001 represents the relationship between bit values set in the PCH support fields 904, 1202 to 1210, and 1309, and support contents corresponding to the respective bit values. A bit value "00" represents that neither a conventional method (S-PCH method) using only one (single) primary channel nor the multi-primary channel (M-PCH) method is supported. A bit value "01" represents that only the S-PCH method is supported. A bit value "10" represents that only the M-PCH method is supported. A bit value "11" represents that both of the methods are supported. A table 1002 represents the relationship between bit values set in the M-PCH availability fields 905 to 913, and availability corresponding to the bit values. A bit value "1" represents that a channel is available as a primary channel, and a bit value "0" represents that a channel is unavailable. Note that set values regarding respective information elements are not limited to this example, and pieces of similar information may be stored with different field names in a different order and different sizes.

Figure 11:
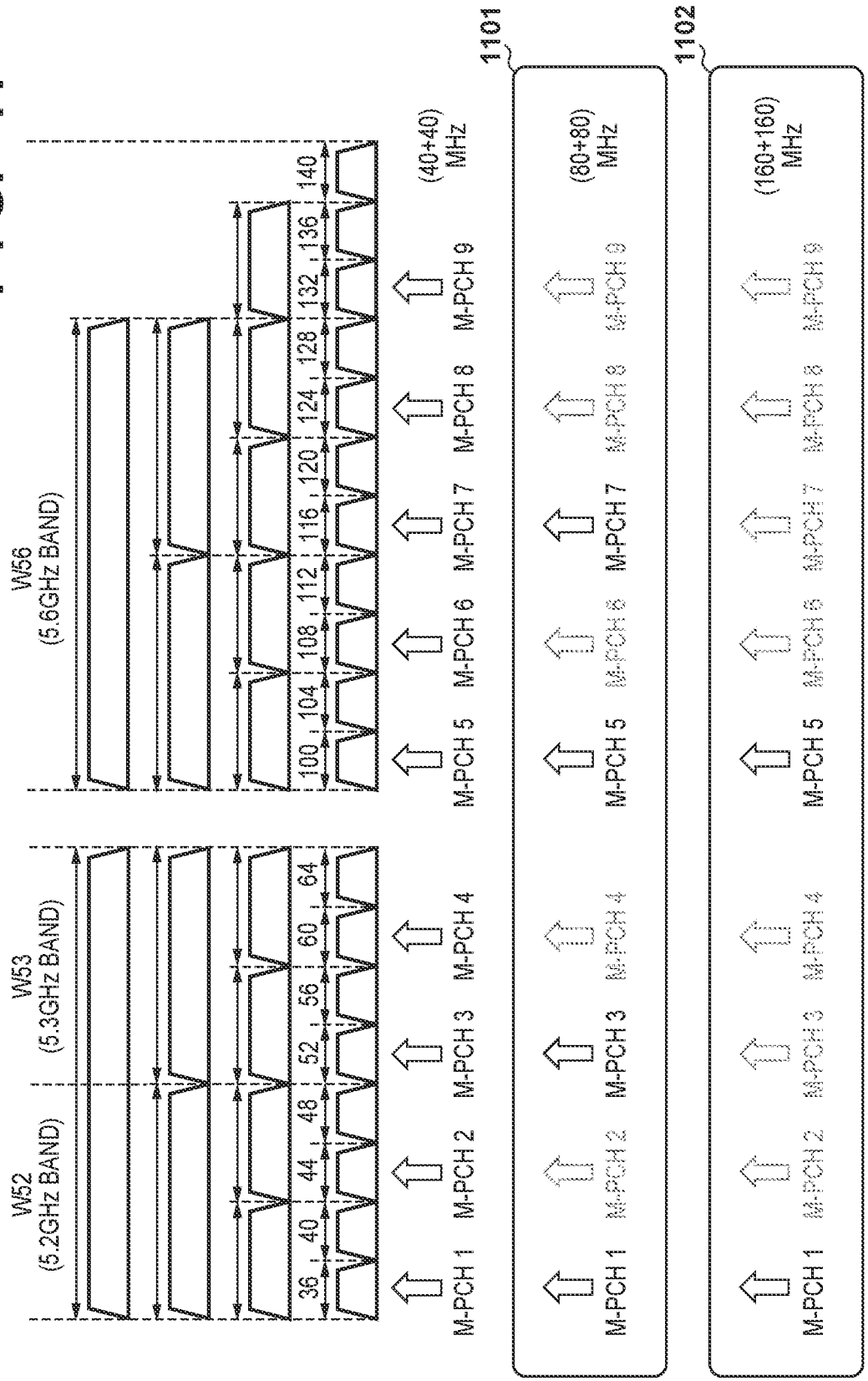
FIG. 11 is a view for explaining a designation example of multi-primary channels in the 5 GHz band.

FIG. 11 is a view for explaining a designation example of multi-primary channels in 5 GHz bands (W52, W53, and W56). M-PCH 1 to M-PCH 9 are a plurality of multi-primary channels available in the 5 GHz band, and are frequency channels of a 20-MHz bandwidth with channel numbers of 36, 44, 52, 60, 100, 108, 116, 124, and 132. In a basic designation example of primary channels, nine M-PCHs, that is, M-PCH 1 to M-PCH 9 are designated on the premise of use of 40+40 MHz. In this case, a bonded frequency band of 40+40 MHz is used. More specifically, one of M-PCH 1 to M-PCH 9 is selected (decided) as a primary channel and then an adjacent channel is bonded (40+40 MHz) as a secondary channel and used.

As the specifications of M-PCHs, M-PCHs to be designated may be limited to clearly designate a band used (80+80 MHz or 160+160 MHz). For example, a designation example 1101 is a designation example of four multi-primary channels M-PCH 1, M-PCH 3, M-PCH 5, and M-PCH 7 on the premise of use of 80+80 MHz. At this time, the channel configuration unit 308 selects a primary channel to be used from the four primary channels in accordance with the use situation of an adjacent primary channel. For example, in a case where channels (M-PCH 2/M-PCH 4) adjacent to W52 (M-PCH 1)+W53 (M-PCH 3) are unavailable, W56 (M-PCH 5 and M-PCH 7) is designated. Similarly, in a case where primary channels in W56 (M-PCH 5 and M-PCH 7) are unavailable, a band of 80+80 MHz is configured using primary channels in W52 or W53. A designation example 1102 is a designation example of two multi-primary channels M-PCH 1 and M-PCH 5 on the premise of use of 160+160 MHz.

[Processing Sequence]

Figure 4:
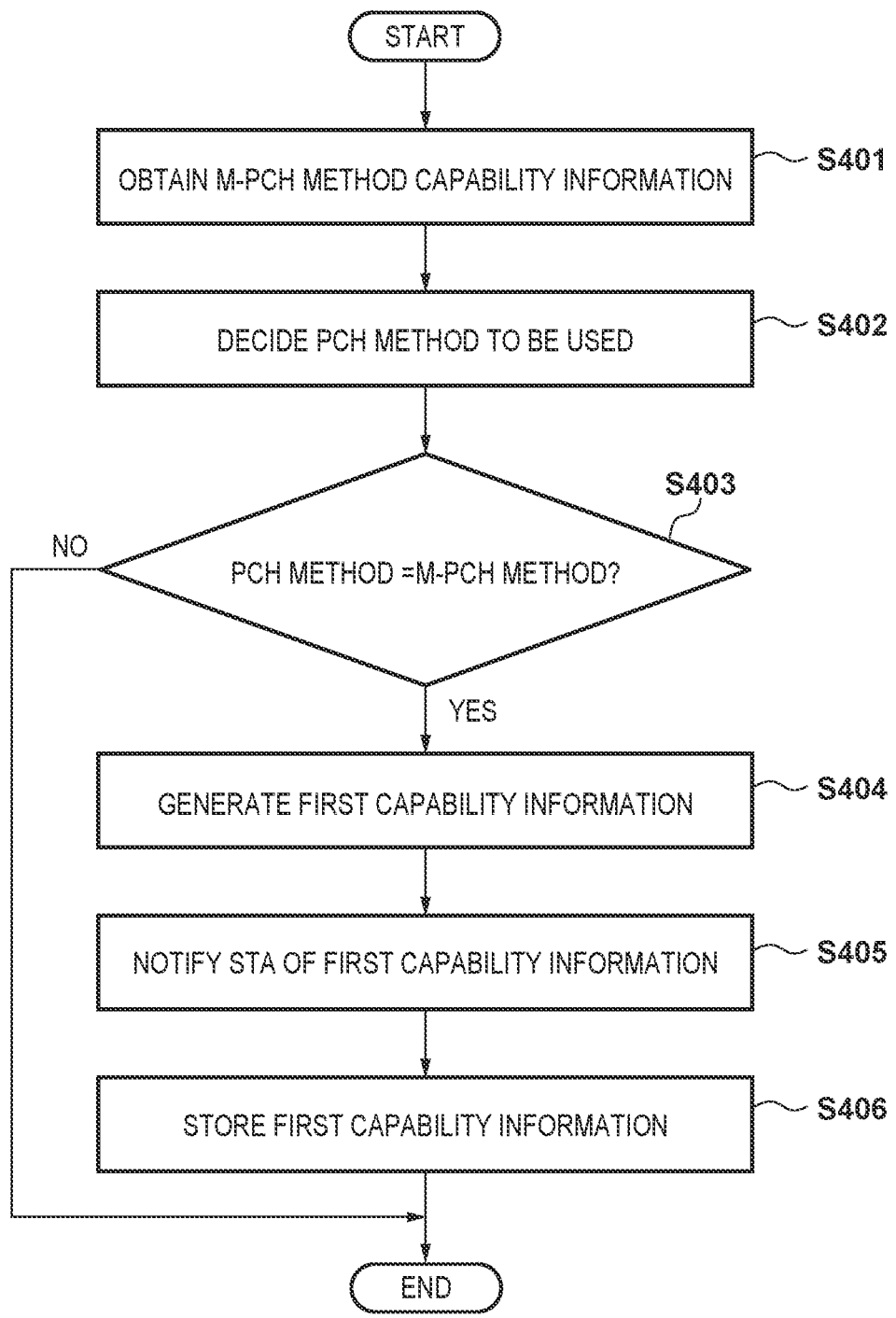
FIG. 4 is a flowchart showing processing executed by an AP at the time of connection of a STA.

Next, the sequence of processing executed by each apparatus in a communication system constituted by the STA 103 (communication partner apparatus) and the AP 102 (communication apparatus) will be described with reference to FIGS. 4 to 9. FIG. 4 is a flowchart showing processing executed by the AP 102 when the STA 103 connects to the AP 102. Note that the following flowchart can be implemented by executing a control program stored in the storage unit 201, and executing calculation and processing of information and control of each hardware by the control unit 202.

First, the management frame communication unit 304 of the AP 102 obtains M-PCH method capability information (see FIG. 11) of the STA 103 (step S401). The M-PCH method capability information can be obtained from a Probe Request frame transmitted from the STA 103 before connection or an Association Request frame transmitted at the time of connection. At this time, before receiving the Probe Request frame or the Association Request frame, the AP 102 may inform a Beacon frame including M-PCH method capability information of the AP 102 in a plurality of primary channels.

Then, the M-PCH method decision unit 301 of the AP 102 decides a PCH method to be used based on the M-PCH method capability information of the STA 103 obtained in step S401 (step S402). In the embodiment, the M-PCH method decision unit 301 makes this decision based on a bit value (FIG. 10) set in the PCH support field 904 in the M-PCH method capability information included in the received management frame. For example, the M-PCH method decision unit 301 can decide to use the M-PCH method in a case where the STA 103 can use only M-PCH, or the S-PCH method in a case where the STA can use only the S-PCH method. In a case where the STA 103 can use both the M-PCH method and the S-PCH method, the M-PCH method decision unit 301 may decide a PCH method to be used in accordance with the characteristics (application characteristics) of data to be transmitted/received to/from the STA 103. For example, in a case where data to be transmitted/received are a smaller amount of data transmitted periodically, like sensor data, the S-PCH method may be selected because this communication is not temporally restricted, unlike RLL communication. In a case where an application of data to be transmitted/received requires a real-time operation, like a game or an industrial robot, that is, a temporally restricted application, the M-PCH method may be selected. Information about the characteristics (application characteristics) of data to be transmitted/received to/from the STA can be announced by an IEEE 802.11 management frame. In a case where there are many users, the overhead in RLL communication becomes large. Thus, in a case where the number of STAs participating in a network formed by the AP exceeds a predetermined threshold, the M-PCH method may be selected regardless of information represented by received capability information.

After deciding a PCH method to be used, the capability information generation unit 302 of the AP 102 determines whether the decided PCH method is the M-PCH method. If the decided PCH method is not the M-PCH method (is the S-PCH method) (NO in step S403), the process ends. If the decided PCH method is the M-PCH method (YES in step S403), the capability information generation unit 302 generates capability information of the M-PCH designation method (step S404). The capability information generated in step S404 will be called first capability information. In the first capability information, information about the PCH method decided in step S403 is included in the PCH support field 904. Then, the capability information generation unit 302 generates a management frame including the first capability information, and the management frame communication unit 304 transmits the management frame (notifies the STA 103 of the first capability information) (step S405). The capability management unit 307 of the AP 102 stores the first capability information in the storage unit 201 (step S406).

Figure 5:
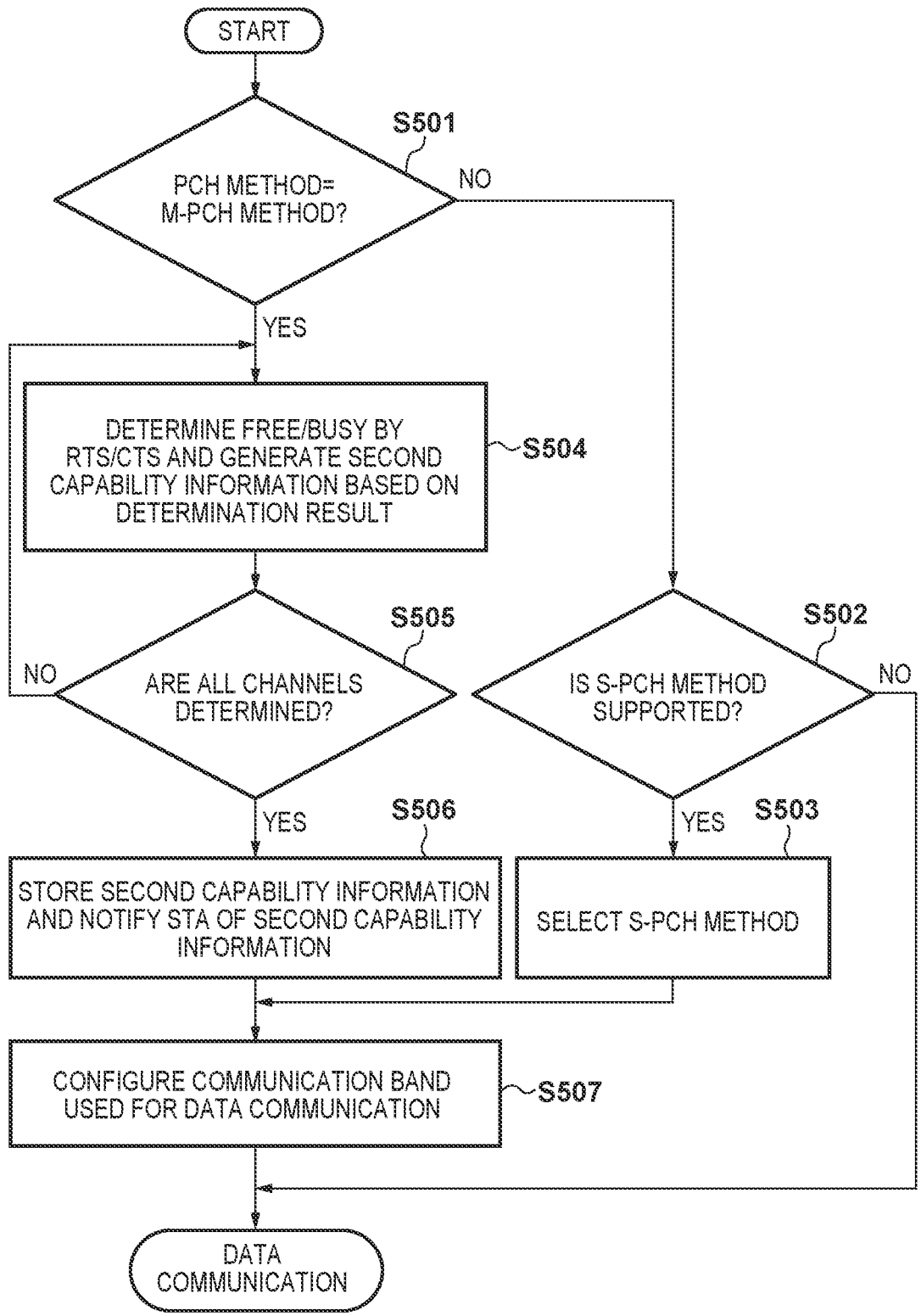
FIG. 5 is a flowchart showing processing executed by the AP to start data communication.

FIG. 5 is a flowchart of processing executed to start data communication after the AP 102 notifies the STA 103 of the first capability information (step S405 in FIG. 4). The capability management unit 307 obtains the first capability information stored in the storage unit 201, and confirms the decided PCH method information, that is, the PCH bit value in the PCH support field 904. If the decided PCH method is the M-PCH method (YES in step S501), the process branches to step S504. If the decided PCH method is not the M-PCH method (NO in step S501), the capability management unit 307 checks whether the AP 102 supports the S-PCH method (step S502). If the AP 102 supports the S-PCH method (YES in step S502), the S-PCH method is selected as a primary channel (step S503), and the process branches to step S507. For example, assume that 36 ch is designated as a primary channel for the S-PCH method. In this case, in step S507, the channel configuration unit 308 uses an adjacent 40 ch channel as a secondary channel and bonds the channels, configuring a communication band of 20 MHz+20 MHz=40 MHz in total for data communication. If the S-PCH method is not supported (NO in step S502), the process ends.

In step S504, the free/busy determination unit 306 performs free/busy determination in one primary channel (to be referred to as a target channel hereinafter) among a plurality of primary channels (see (the number of) M-PCH availability fields 905 to 913 in FIG. 11) designated by the first capability information stored in the storage unit 201. For this determination, the free/busy determination unit 306 transmits a RTS (Request To Send) message serving as a control frame. Upon receiving RTS in the target channel, the STA 103 performs carrier sense of the target channel. If the target channel is not busy as a result of the carrier sense, the STA 103 transmits a CTS (Clear To Send) message serving as a control frame to the AP 102 after the lapse of a SIFS (Short Inter Frame Space) period. The free/busy determination unit 306 of the AP 102 checks reception of CTS serving as a response to the RTS in the target channel in which the RTS has been transmitted, and if it confirms the reception, determines that the target channel is an available primary channel. At this time, if the free/busy determination unit 306 cannot confirm the reception of CTS in the target channel, it determines that the target channel cannot be used for channel access. Then, the capability information generation unit 302 generates capability information of a M-PCH designation method. The capability information generated in step S504 will be called second capability information. In the second capability information, bit values corresponding to free/busy are included in the M-PCH availability fields 905 to 913 corresponding to the target channel. The free/busy determination unit 306 performs free/busy determination with respect to all the designated primary channels (NO in step S505 and step S504). After the end of the determination (step S505), the process advances to step S506. In the above description, the result of free/busy determination of one primary channel is reflected in the second capability information, and then similar processing is performed on another target channel. Alternatively, free/busy determination may be performed on all primary channels, and then the second capability information may be generated.

Figure 8:
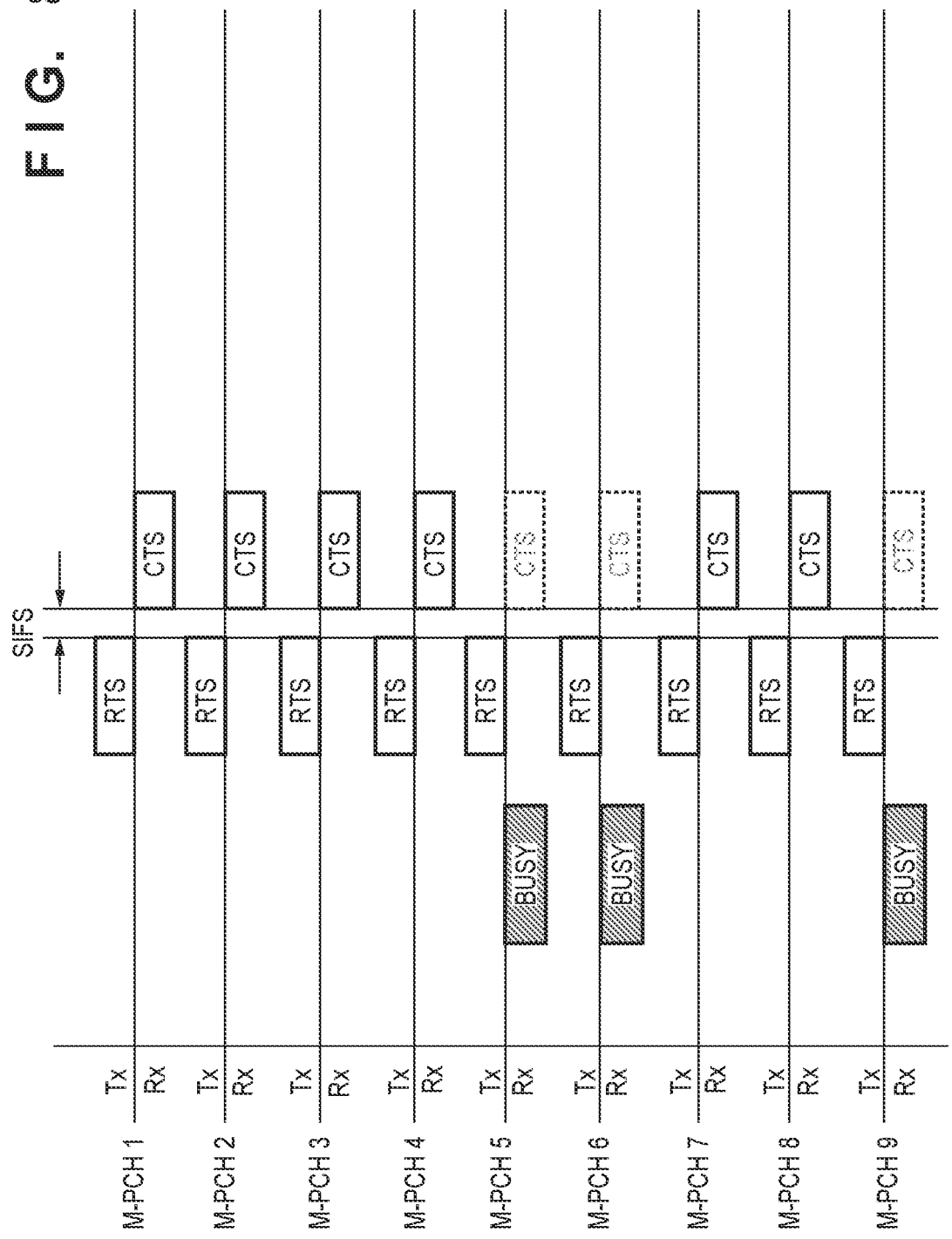
FIG. 8 is a flowchart of free/busy determination processing of a primary channel.

Free/busy determination processing by the free/busy determination unit 306 will be described with reference to FIG. 8. FIG. 8 is a flowchart of free/busy determination processing. In downlink (DL) communication from the AP 102 to the STA 103, the AP 102 serves as Tx and the STA 103 serves as Rx. To the contrary, in uplink (UL) communication from the STA 103 to the AP 102, the STA 103 serves as Tx and the AP 102 serves as Rx. RTS is a message of a control frame sent for inquiry of data transmission from the transmitting side to the receiving side, and CTS represents transmission permission in a control frame sent back to the transmitting side as a response to the RTS. BUSY represents that the channel of RTS transmitted from Tx is being used by Rx. SIFS is the waiting time of carrier sense when sending back CTS after receiving RTS. Here, an example will be described in which free (available) channel determination is performed on nine multi-primary channels for bonding (channel bonding) of 40+40 MHz or more (80+80 MHz or 160+160 MHz). In FIG. 8, when RTS is transmitted as a determination result, M-PCH 5, M-PCH 6, and M-PCH 9 are BUSY and no CTS can be confirmed in these channels.

Referring back to FIG. 5, in step S506, the capability management unit 307 stores the generated second capability information in the storage unit 201. In step S506, the capability information generation unit 302 generates a management frame including the second capability information, and the management frame communication unit 304 transmits the management frame (notifies the STA 103 of the second capability information). If the process shifts from step S506 to step S507, the channel configuration unit 308 performs channel access using the M-PCH method for the STA 103 based on the second capability information. The AP 102 selects (decides), from M-PCH 1 to M-PCH 9, a primary channel used to transmit/receive data frames between the AP 102 and the STA 103. After that, the channel configuration unit 308 bonds the selected primary channel and, as a secondary channel, a channel adjacent to the primary channel, configuring them as a communication band used for data communication. For example, when M-PCH 1 is selected, an adjacent M-PCH 2 channel is used as a secondary channel, and these channels are bonded and configured as a communication band of 40+40 MHz. In response to this, the STA 103 shifts to a data communication state in which a data frame transmitted from the AP 102 is received in the communication band of 40+40 MHz.

Selection of a primary channel by the channel configuration unit 308 in a case where the process shifts from step S506 to step S507 can be performed under an arbitrary condition. For example, the channel configuration unit 308 can select a primary channel based on at least any one of a transmission bandwidth securable by channel bonding, a reception field intensity, a signal-to-noise ratio (SNR), a channel transmission capacity calculated from the bandwidth and SNR, and the frequency of use estimated from a channel use state in a predetermined period. That is, for example, the channel configuration unit 308 can select a channel which maximizes a securable transmission bandwidth by bonding of channels (channel bonding). The channel configuration unit 308 may select a channel in which the reception field intensity is highest or a channel in which the signal-to-noise ratio (SNR) is best. Further, the channel configuration unit 308 may select a channel in which a channel transmission capacity calculated from the bandwidth and SNR is large, or a channel based on free channel information estimated from a channel use state in a predetermined period. As for the primary channel selection conditions, one of these conditions or a combination of conditions may be used.

FIG. 5 is a flowchart of processing executed by the AP 102. However, even processing executed by the STA 103 can also be similarly implemented by exchanging the AP 102 and the STA 103, and a description thereof will be omitted.

Figure 6:
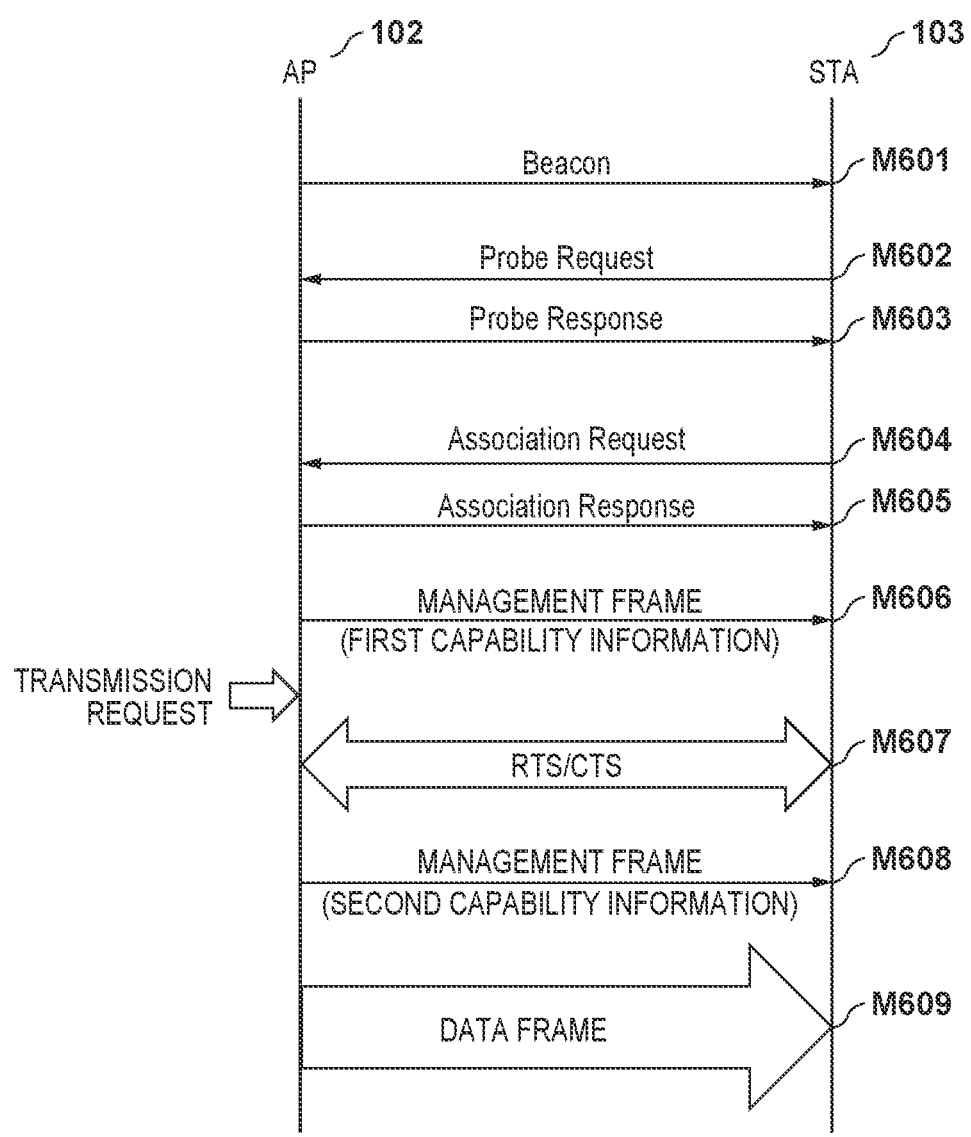
FIG. 6 is a message sequence chart between the AP and the STA at the time of DL communication.

Communication sequences between the AP 102 and the STA 103 at the time of DL communication and at the time of UL communication will be explained with reference to FIGS. 6 and 7. FIG. 6 is a sequence chart between the AP 102 and the STA 103 at the time of DL communication. M601 to M603 represent scan processing for obtaining network information of the AP 102 by the STA 103. In M601, the AP 102 notifies the STA 103 in the network of the BSS 101 of a Beacon frame including network information of the AP 102. In M602, the STA 103 transmits a Probe Request frame inquiring network information of the AP 102. In M603, the AP 102 transmits a Probe Response frame as the response. The STA 103 may obtain network information of the AP 102 by receiving the Beacon frame (M601) transmitted from the AP 102. Alternatively, the STA 103 may obtain network information of the AP 102 by actively transmitting a Probe Request frame (M602) and receiving a Probe Response frame from the AP 102 (M603). Capability information (see FIG. 11) of the M-PCH method of the AP 102 can be included in a Beacon frame or a Probe Response frame. Particularly, a Beacon frame including the M-PCH method capability information may be announced in a plurality of primary channels. The M-PCH method capability information (see FIG. 11) of the STA 103 can be included in a Probe Request frame. By these processes, the STA 103 and the AP 102 can exchange their M-PCH method capability information.

In M604, the STA 103 transmits an Association Request frame to connect to the network of the BSS 101. In M605, the AP 102 transmits an Association Response frame representing the connection result. The M-PCH method capability information can be included in even the Association Request frame and the Association Response frame. Based on the M-PCH method capability information of the AP 102 obtained by scan processing, the STA 103 may decide M-PCH method capability information to be included in the Association Request frame. For example, in a case where the STA 103 can use both the S-PCH method and the M-PCH method but the AP 102 can use only the M-PCH method, the M-PCH method capability information of the STA 103 to be included in the Association Request frame may represent that only the M-PCH method can be used. Similarly, based on the M-PCH method capability information of the STA 103 included in the Association Request frame, the AP 102 may decide M-PCH method capability information to be included in the Association Response frame. In this example, as shown in FIG. 4, the AP 102 decides to employ the M-PCH method, generates the first capability information (step S404), and notifies the STA 103 of the first capability information by a management frame in M606 (step S405).

M607 after a data transmission request from a user or the like is a message sequence regarding free/busy determination processing of multi-primary channels. Processing performed in M607 is similar to processing contents described in steps S504 to S506 of FIG. 5, and a description thereof will be omitted. Note that the message sequence regarding free/busy determination processing of a primary channel using RTS and CTS is shown in FIG. 8. In M608, the AP 102 transmits to the STA 103 a management frame 2 including the second capability information generated based on the processing in M607. In M609, the AP 102 transmits to the STA 103 a data frame of DL communication using a communication band obtained by bonding the primary channel and the secondary channel, as described in step S507 of FIG. 5. At this time, the AP 102 has completed the connection sequence (M601 to M605) in advance, so the Beacon frame (M601) need not be transmitted in the primary channel used for the channel bonding.

Figure 7:
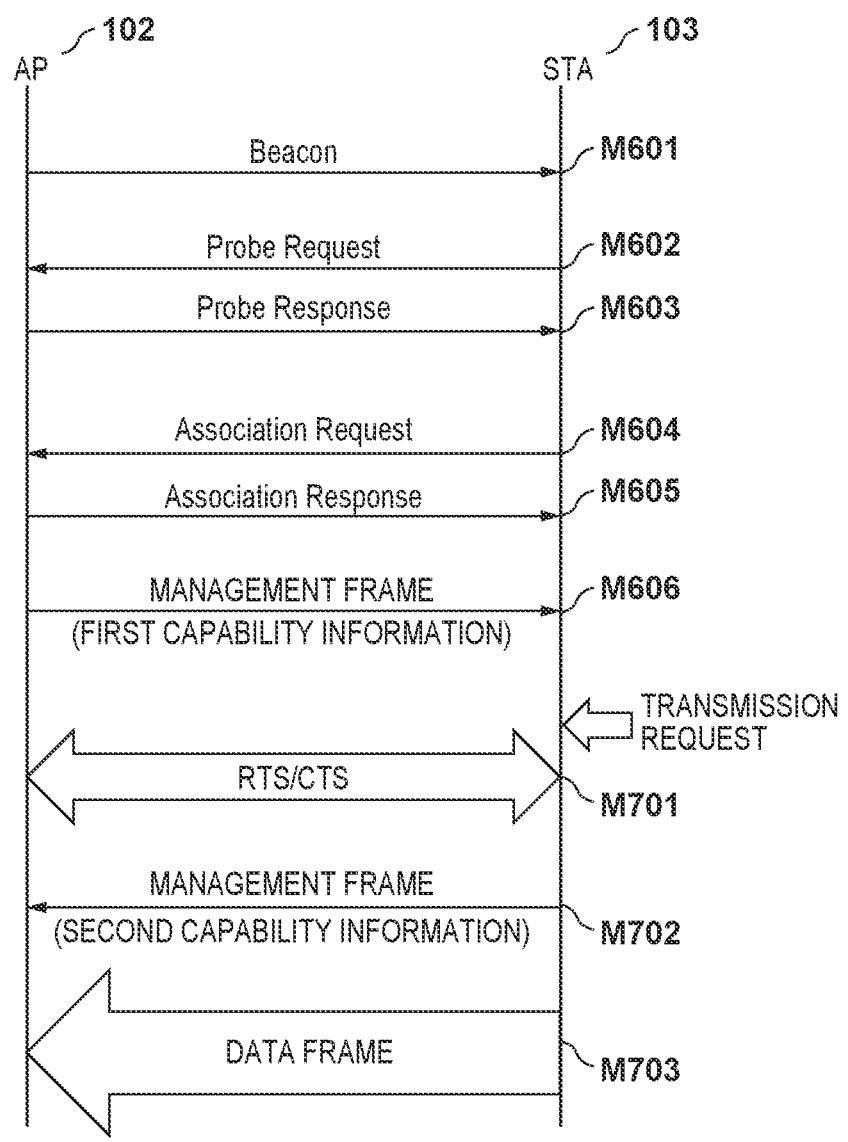
FIG. 7 is a message sequence chart between the AP and the STA at the time of UL communication.

FIG. 7 is a sequence chart between the STA 103 and the AP 102 at the time of UL communication. Scan processing in M601 to M603, connection processing of the STA 103 in M604 and M605, and transmission/reception processing regarding transmission of a management frame in M606 are similar to those in FIG. 6, and a description thereof will be omitted. M701 after a data transmission request from a user or the like is a message sequence regarding free free/busy determination processing of multi-primary channels in the STA 103. Based on the first capability information received in M606, the STA 103 transmits a RTS message as a control frame for free/busy determination to respective available primary channels. Upon receiving RTS from each primary channel, the AP 102 performs carrier sense of the channel. If the channel is not busy as a result of the carrier sense, the AP 102 transmits a CTS message serving as a control frame to the STA 103 after the lapse of the SIFS period. The STA 103 checks reception of CTS serving as a response to the RTS in each primary channel in which RTS has been transmitted, and determines that the reception-confirmed channel is an available primary channel. As for a primary channel for which reception of CTS has not been confirmed, the STA 103 determines that the primary channel cannot be used for channel access. The STA 103 generates the second capability information from the result of determination. The message sequence regarding free/busy determination processing of multi-primary channels between the STA 103 and the AP 102 in M701 is shown in FIG. 8.

If the free/busy determination has been completed for all the available primary channels (YES in step S505), the STA 103 stores the second capability information in the storage unit 201. In M702, the STA 103 transmits to the AP 102 a management frame 2 including the second capability information that has been obtained by the processing in M701 and is stored in the storage unit 201. In M703, the STA 103 transmits to the AP 102 a data frame of UL communication using a communication band obtained by bonding the decided primary channel and secondary channel, as described in step S507 of FIG. 5. At this time, the AP 102 has completed the connection sequence (M601 to M605) in advance, so the Beacon frame (M601) need not be transmitted in the primary channel used for the channel bonding.

As described above, according to the embodiment, capability information of the multi-primary channel method can be exchanged between the STA and the AP. Even in an environment where it is difficult to occupy a channel and ensure a free channel, an IEEE 802.11-compliant wireless environment suited to an application satisfying the reliable low-latency requirement while reducing the latency of channel access can be provided.

The present invention provides a mechanism for announcing capability information that designates multi-primary channels (M-PCH).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus for performing communication in compliance with IEEE 802.11 series comprising:
   one or more processors; and
   one or more memories storing instructions that, when executed by the one or more processors, cause the communication apparatus to:
      determine whether or not to use specific communication function based on a number of stations connected to a network formed by the communication apparatus, control the communication apparatus to transmit a Media Access Control (MAC) frame including capability information indicating that the communication apparatus is capable of identifying at least one channel which is selected from a plurality of candidate channels which are expected to be used by bonding with a specific primary channel in an idle state, and which is permitted to be accessed and used for communication even when the specific primary channel is in a busy state, and control the communication apparatus to transmit a second MAC frame different from the MAC frame, the second MAC frame not including the capability information and including other capability information storing information different from the capability information in a case where the specific communication function is determined not to be used, wherein the communication apparatus communicates a frame to another communication apparatus via at least one channel detected to be in the idle state, in a case where the communication detects that the specific primary channel is in the busy state and that the selected at least one channel is in the idle state, wherein in a case where the specific communication function is determined to be used, the communication apparatus does not transmit a frame to other communication apparatus using only channels which consist of the plurality of channel candidate channels which are expected to be used by bonding with the specific primary channel.

2. The communication apparatus according to claim 1, wherein the one or more processors execute the stored instructions to further cause the communication apparatus to:

communicate with another communication apparatus using a bonding channel, whose bandwidth is wider than 20 MHz, which is formed by bonding the at least one channel included in the MAC frame different form the specific primary channel which is detected to be in the idle state with a channel adjacent to detected the channel to be in the idle state.

3. The communication apparatus according to claim 1, wherein the communication apparatus functions as an access point.

4. A control method of a communication apparatus for performing communication in compliance with IEEE 802.11 series, comprising:

determining whether or not to use a specific communication function based on a number of stations connected to a network formed by the communication apparatus, controlling the communication apparatus to transmit a Media Access Control (MAC) frame including capability information indicating that the communication apparatus is capable of identifying at least one channel which is selected from a plurality of candidate channels which are expected to be used by bonding with a specific primary channel in an idle state, and which is permitted to be accessed and used for communication even after the specific primary channel is in a busy state, and controlling the communication apparatus to transmit a second MAC frame different from the MAC frame, the second MAC frame not including the capability information and including other capability information storing information different from the capability information after the specific communication function is determined not to be used, wherein the communication apparatus communicates a frame to another communication apparatus via at least one channel detected to be in the idle state, after the communication detects that the specific primary channel is in the busy state and that the selected at least one channel is in the idle state, wherein in a case where the specific communication function is determined to be used, the communication apparatus does not transmit a frame to other communication apparatus using only channels which consist of the plurality of channel candidate channels which are expected to be used by bonding with the specific primary channel.

5. A non-transitory computer-readable storage medium storing instructions for causing a computer to execute a method of a communication apparatus for performing communication in compliance with IEEE 802.11 series, the method comprising:

determining whether or not to use a specific communication function based on a number of stations connected to a network formed by the communication apparatus, controlling the communication apparatus to transmit a Media Access Control (MAC) frame including capability information indicating that the communication apparatus is capable of identifying at least one channel which is selected from a plurality of candidate channels which are expected to be used by bonding with a specific primary channel in an idle state, and which is permitted to be accessed and used for communication even when the specific primary channel is in a busy state, and controlling the communication apparatus to transmit a second MAC frame different from the MAC frame, the second MAC frame not including the capability information and including other capability information storing information different from the capability information in a case where the specific communication function is determined not to be used, wherein the communication apparatus communicates a frame to another communication apparatus via at least one channel detected to be in the idle state, in a case where the communication detects that the specific primary channel is in the busy state and that the selected at least one channel is in the idle state, wherein in a case where the specific communication function is determined to be used, the communication apparatus does not transmit a frame to other communication apparatus using only channels which consist of the plurality of channel candidate channels which are expected to be used by bonding with the specific primary channel.

* * * * *